US007533043B2

(12) United States Patent
Carney et al.

(10) Patent No.: US 7,533,043 B2
(45) Date of Patent: May 12, 2009

(54) SUPPLIER SYNCHRONIZATION SYSTEM AND METHOD

(75) Inventors: Trish Carney, Marengo, OH (US); Ted Kondo, Marysville, OH (US); Masayuki Tamai, Dublin, OH (US); Neil Vining, Ostrander, OH (US)

(73) Assignee: Honda Motor Co., Ltd., Tokyo (JP)

(*) Notice: Subject to any disclaimer, the term of this patent is extended or adjusted under 35 U.S.C. 154(b) by 1243 days.

(21) Appl. No.: 10/601,379

(22) Filed: Jun. 23, 2003

(65) Prior Publication Data
US 2005/0065827 A1    Mar. 24, 2005

Related U.S. Application Data (63) Continuation of application No. 09/632,683, filed on Aug. 7, 2000, now abandoned.

(51) Int. Cl.
*G06Q 10/00* (2006.01)
(52) U.S. Cl. .............................. 705/28; 705/8; 700/99; 700/106
(58) Field of Classification Search ................ 705/8, 705/9, 10, 28; 700/99, 106
See application file for complete search history.

(56) References Cited

U.S. PATENT DOCUMENTS

| 4,958,292 A |   | 9/1990  | Kaneko et al.  | 364/468 |
|-------------|---|---------|----------------|---------|
| 5,278,750 A |   | 1/1994  | Kaneko et al.  | 364/401 |
| 5,463,555 A | * | 10/1995 | Ward et al.    | 364/468 |
| 5,528,489 A |   | 6/1996  | Asahara et al. | 364/402 |
| 5,765,143 A |   | 6/1998  | Sheldon et al. | 705/28  |
| 5,850,446 A |   | 12/1998 | Berger et al.  | 380/24  |
| 5,923,552 A |   | 7/1999  | Brown et al.   | 364/468.06 |
| 5,974,395 A |   | 10/1999 | Bellini et al. | 705/9   |

(Continued)

FOREIGN PATENT DOCUMENTS
WO       WO 00/29999       5/2000

OTHER PUBLICATIONS

Trebuchon, Maurice A., Logistics Meets the Enterprise, Material Handling and Engineering, Dec. 1998, v. 53, n. 13, pp. SCF6-SCF10.

(Continued)

*Primary Examiner*—Andrew Joseph Rudy
(74) *Attorney, Agent, or Firm*—Standley Law Group LLP (57) ABSTRACT

A system and method for synchronization of a supplier's production with a manufacturer's production is disclosed. A manufacturer's supply orders are submitted to suppliers during the manufacturer's production taking into account the time required to manufacture, transport, unload, stage, and move the supplies to a location at a production line. Associated with each supply order is a production delivery time that indicates when the supplies are needed at the manufacturer's facility. The supplier, upon receipt of the supply order, starts its manufacturing process to produce the requested supplies to meet the manufacturer's production delivery time. The supplies are then shipped from the supplier to the manufacturer's facility for use in the manufacturer's production line. Upon arrival at the manufacturer's facility, some supplies may be moved immediately to the production line. Other supplies may be moved within minutes or hours of arrival at the manufacturer's facility. In either case, supplies manufactured by the supplier during the production run are consumed by the end of the production run so that no inventory for certain supplies is maintained by the manufacturer.

21 Claims, 4 Drawing Sheets

U.S. PATENT DOCUMENTS

| | | | | |
|---|---|---|---|---|
| 5,983,194 | A | 11/1999 | Hogge et al. | 705/7 |
| 5,983,195 | A | 11/1999 | Fierro | 705/10 |
| 6,125,391 | A | 9/2000 | Meltzer et al. | 709/223 |
| 6,345,259 | B1 * | 2/2002 | Sandoval | 705/7 |
| 6,414,195 | B1 * | 7/2002 | Ueno et al. | 568/482 |
| 6,415,195 | B1 * | 7/2002 | Gleditsch et al. | 700/99 |
| 6,434,259 | B1 * | 8/2002 | Hamid et al. | 382/115 |
| 6,463,345 | B1 * | 10/2002 | Peachey-Kountz et al. | 700/99 |

OTHER PUBLICATIONS

Greene, James H., Production and Inventory Control Handbook, Third Edition, Apr. 3, 1997, pp. 16.4, 18.34.

Frazier, Gregory V. et al., Applying Synchronous Manufacturing Concepts to Improve Production Performance in High-Tech Manufacturing, Production and Inventory Management Journal, 3$^{rd}$ Qtr. 000, v. 41, n. 3, pp. 60-65.

Plock, stew, The Internet, Java and the Auto Industry, Automotive Manufacturing and Production, Jan. 1997, v. 109, n. 1, pp. 60-62.

* cited by examiner

SUPPLIER SYNCHRONIZATION SYSTEM AND METHOD

CROSS REFERENCE TO RELATED APPLICATION

This application is a continuation of U.S. application Ser. No. 09/632,683, filed Aug. 7, 2000, now abandoned, which is expressly incorporated herein by reference.

TECHNICAL FIELD

The present invention relates to supply ordering for a manufacturing facility. More particularly, the present invention relates to a system and method for ordering supplies to synchronize supplier production with a manufacturer's production requirements.

BACKGROUND OF THE INVENTION

Manufacturers often maintain a large inventory of supplies and parts in order to meet production requirements at their assembly plants. Inventory may be maintained at the assembly plant as well as at warehouses and other storage facilities. Supplies and parts are stored at these various locations until they are needed at the assembly plant production line. The maintenance of inventory at assembly plants and related facilities can be very costly to a manufacturing organization. The space requirements for simply holding inventory may be significant and therefore, costly. Costs may also be increased if inventory must be moved from one location to another before it is used in a production line. Furthermore, a large amount of inventory reduces flexibility to respond to market demand.

Many manufacturers have attempted to control inventory costs by reducing the amount of inventory they maintain. For example, some manufacturers may wait to place supply orders until shortly before a particular part is needed. Using this approach, a manufacturer may reduce the amount of time that a part or supply is in its inventory. However, the manufacturer is still required to maintain an inventory using this approach. A manufacturer may also ask a supplier to postpone delivery of a particular order until shortly before the supplies are needed. Using this approach, the supplier effectively maintains the inventory on behalf of the manufacturer. Any associated costs are likely to be passed on to the manufacturer so there is no real benefit to the manufacturer to have the supplier postpone delivery.

Some attempts have been made to control inventory through the ordering process. U.S. Pat. No. 5,765,143 to Sheldon, et al. discloses a system and method for controlling inventory of vendors at one level of a part distribution chain. The inventory control system generates order data in response to reference data that is indicative of sales, inventory, demographics, and/or market characteristics of at least two vendors. The order data relates to a recommended inventory increase transaction, inventory reduction transaction, and a recommended stocking level of one or more parts by the vendor.

U.S. Pat. No. 5,974,394 to Bellini, et al. discloses a system for enterprise planning across a supply chain. The system operates bi-directionally so that integrated planning-and-scheduling information is exchanged horizontally and vertically across the supply chain. Each organization that participates in the supply chain can view the entire supply chain and assist the enterprise in executing more efficient planning strategies. However, the system does not address problems related to inventory control.

U.S. Pat. No. 5,983,195 to Fierro discloses a system and method for scheduling product orders that results in a dynamic association of customer product orders with physical products on a production line. A product order record and a physical product record list attributes related to the physical features of a manufactured item. The attributes of each record are compared to determine if the product order may be associated with the physical product on the production line. The physical product is then used to fulfill the product order. The dynamic association may occur at different points in the manufacturing process. The system and method do not address problems related to inventory control.

None of the above references relate to the synchronizing of production between a supplier and a manufacturer so that the inventory maintained by a manufacturer is eliminated or reduced significantly.

SUMMARY OF THE INVENTION

The present invention is a system and method for synchronizing production between a supplier and a manufacturer to meet the manufacturer's production needs. Production is synchronized such that the manufacturer's requests for supplies are submitted to suppliers during production taking into account the time required to manufacture, transport, stage, and move the supplies to a location at the manufacturing production line. The manufacturer's production schedules are shared with the various suppliers so that each supplier can plan and prepare to process incoming supply orders and to deliver supplies in accordance with the manufacturer's projected production needs. During the production process, delivery requests for supplies are submitted to different suppliers based on the manufacturer's production needs at a particular time. Associated with each supply order is a production delivery time that indicates when the supplies are needed at the manufacturer's facility. Supply orders are based in part on actual production requirements rather than projected production requirements. Prior to submitting a supply order, a supplier may be, asked to provide a capacity confirmation to make sure the supplier is able to meet the delivery request.

The supplier, upon receipt of the delivery request, starts its manufacturing process to produce the requested supplies to meet the manufacturer's production delivery time. Upon completion of the manufacturing process, the supplies are shipped from the supplier to the manufacturer's facility for use in the manufacturer's production line. In some cases, the final assembly process is synchronized rather than the entire production. The incoming supplies are then moved to a location in the manufacturing production line for use in the production or assembly process. Upon arrival at the manufacturer's facility, some supplies may be moved immediately to the manufacturing production line. Other supplies may be moved within minutes or hours of arrival at the manufacturer's facility. The differences are caused in part by trailer cubing efficiency. In a few instances, the time to move the supplies to the manufacturing production line may be longer. The rate at which supplies are consumed upon delivery may depend upon the level of synchronization between the supplier's production system and the manufacturer's production needs. Some suppliers may require a longer lead time to deliver supplies due to production and transportation constraints. However, because ordering is based in part on actual production requirements and takes into account the supplier manufacturing and delivery time, most supplies are consumed within minutes or hours of arrival at the manufacturer's facility. Because supplies are both produced and consumed as they are needed, the manufacturer and the supplier are not required to carry an inventory of supplies other than for transportation efficiency. By tying supplier production with the manufacturer's production needs and minimizing the lead time required to produce and transport supplies, the costs associated with maintaining an inventory are virtually eliminated.

The system of the present invention comprises a plurality of manufacturer and supplier computer systems through which information regarding production schedules, production sequences, supply orders, production delivery times, acknowledgments, etc. is exchanged. The system may further comprise seller computer systems that communicate with the manufacturer computer systems to exchange information regarding seller orders, product delivery times, etc. Communications between the manufacturer's computer systems and suppliers' computer systems are coordinated so that supply orders and delivery timings are submitted from the manufacturer's computer systems to the suppliers' computer systems during the manufacturer's production process. Upon receipt of a supply order and delivery schedule, a supplier starts its own manufacturing process so that the requested supplies are delivered in accordance with the production delivery time of the supply order.

Using the present invention, a manufacturing operation can develop a supply pipeline that virtually eliminates the need to maintain a manufacturing supply inventory other than for transportation efficiency. Supplies are ordered based on the manufacturer's production needs. Supplies are produced when a supplier receives a supply order from the manufacturer. Supplies are consumed within minutes or hours after delivery of the supplies to the manufacturer's facility. The synchronization of the supplier's and manufacturer's production results in a cycle of production and consumption that reduces lead time and virtually eliminates the need to maintain an inventory.

DESCRIPTION OF EXAMPLE EMBODIMENTS

Figure 1:
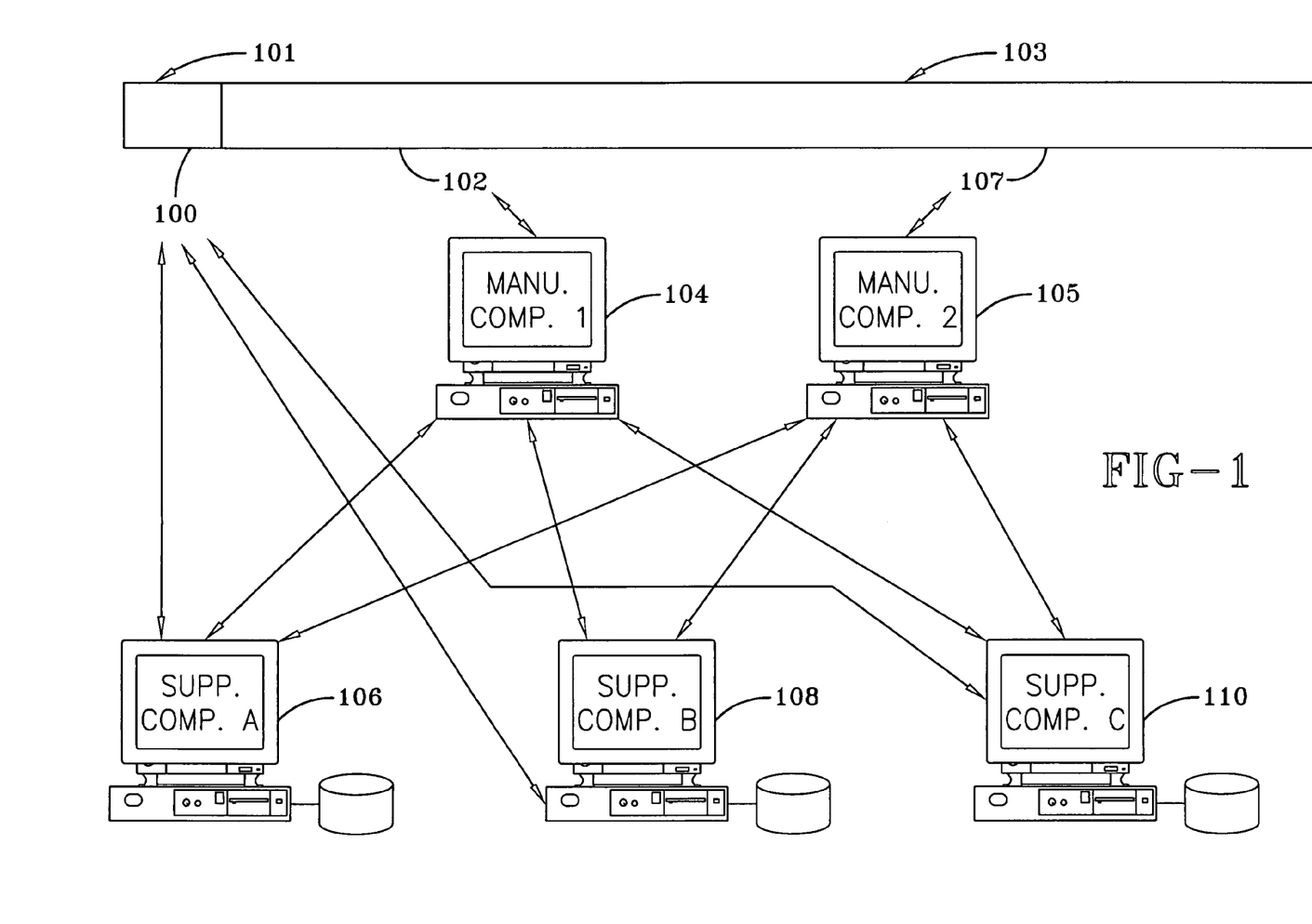
FIG. 1 is a schematic diagram illustrating the ordering of supplies according to the invention.

Referring to FIG. 1, a schematic diagram illustrating the ordering of supplies according to the invention is shown. Prior to manufacture 101 a production schedule 100 is issued to suppliers computers 106, 108, and 110. At various points 102, 107 along a manufacturing production line 103 supplies are needed so that the production or assembly process can be completed by individuals who work on the production line. Prior to placing a supply order, a supplier may be asked to provide a capacity confirmation to make sure the supplier is able to meet the delivery request.

In some cases, the supplies may be used in equipment that operates in the production or assembly process. In either case, supplies are made available as needed to keep the production line operational. In accordance with the present invention, supplies are ordered from different suppliers as they are needed. The need for supplies is determined in conjunction with the manufacturer's production sequence which sets forth what supplies are required at a particular location and at a particular time in order to continue production. Production sequences are determined at the earliest point in the production line. A production sequence comprises information and details regarding the item to be produced. For example, in an automobile manufacturing application, the production sequence may comprise the model, type, options, and color for the automobiles to be produced at a particular assembly line. Assuming no other changes are made to the production sequence, by production run time, supply requirements timing at the location is clear and may be communicated to suppliers through supply orders.

Based on supply requirements at the production line for the production sequence, orders for supplies are transmitted to suppliers during the production process 103. In one embodiment of the present invention as shown in FIG. 1, requests for supplies may be transmitted from manufacturer computers 104, 105 throughout the production process 103 to supplier computers 106, 108, 110. The manufacturer computers 104, 105 are adapted to transmit supply orders or requests to supplier-computers as production requirements dictate. For example, at a point during production 102, manufacturer computer (1) 104 may transmit an order to supplier A computer 106 when the production starts at this location. At another point during production 107 manufacturer computer (2) 105 may also transmit one or more supply orders to the supplier computers 106, 108, 110. Various conditions may trigger the transmission of a supply order from a manufacturer computer to a supplier computer. In addition, transmission of supply orders may occur automatically when certain criteria are met. Alternatively, individuals in the manufacturing facility can submit orders when certain criteria are met. Regardless of how supply orders are initiated from the manufacturer computers, the supplier computers 106, 108, 110 are adapted to receive the supply orders within seconds or minutes of transmission from the manufacturer computers so that the supplier can start making arrangements to produce and deliver the requested supplies to meet the manufacturer's production requirements for the production sequence.

Figure 2:
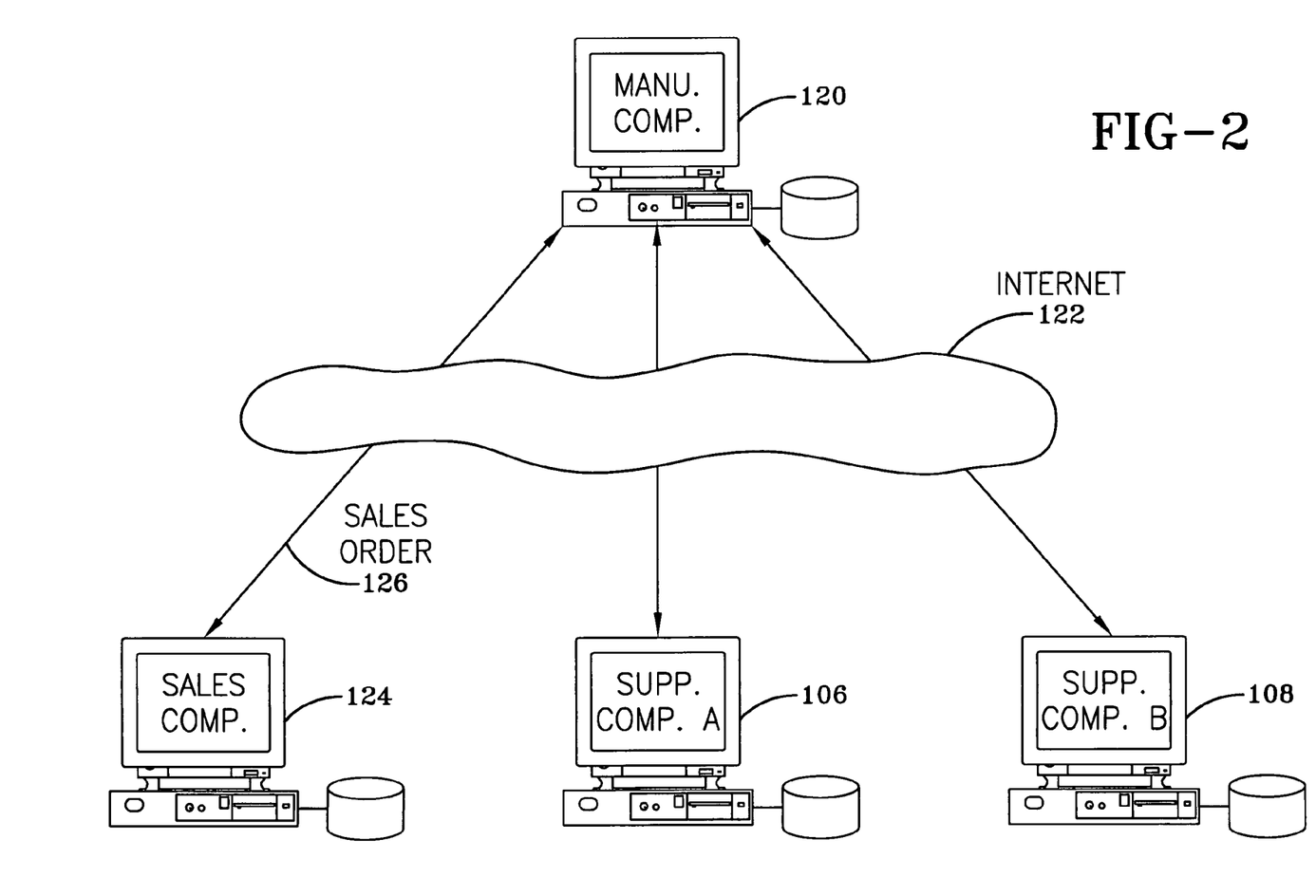
FIG. 2 is a schematic diagram illustrating the system of ordering supplies according to the invention.

Referring to FIG. 2, a schematic diagram illustrating the system of ordering supplies according to the invention is shown. As shown in FIG. 2, in an example embodiment of the present invention, one manufacturer computer 120 may be adapted for communication with multiple supplier computers (e.g., supplier A computer 106 and supplier B computer 108). Communications between the manufacturer computer 120 and supplier A computer 106 and supplier B computer 108 are accomplished using the Internet 122 so that they occur expeditiously. Additional precautions may be taken and measures introduced so that communications are exchanged between the computers with minimal delays (i.e., seconds or minutes). In an example embodiment of the present invention, each manufacturer and supplier computer is equipped with an Internet Protocol (IP) address and communications between the computers are completed in accordance with TCP/IP. In an example embodiment of the present invention for the automotive industry, application software operating at each of the computers conforms to standards established by the Automotive Network eXchange (ANX) which is a TCP/IP based virtual private network that interconnects automotive industry trading partners. The standards include rigorous performance standard so that information is exchanged quickly and reliably between trading partners. Software that conforms to the standards may be used so that communications are exchanged with minimal delays.

In an example embodiment, supply order data may be exchanged between the manufacturer computer 120 and supplier A computer 106 and supplier B computer 108 using XML. The XML guidelines and conventions for designing text formats allow the manufacturer and suppliers to easily and quickly produce files with supply order data. In addition, XML may be used to share manufacturer production schedules with suppliers so that suppliers can prepare and plan for the supply orders that are submitted during the production process.

The supply order data submitted by the manufacturer computer to the supplier computers comprises a production sequence. For example, in an automobile manufacturing plant, a production sequence may comprise information and details about the model, type, options, and color for the automobiles to be produced at a particular assembly line. The supply order data further comprises a production delivery time and a production line location. The production delivery time indicates when the supplies are needed for the production sequence. The production line location indicates where the supplies are needed for the production sequence. When submitting supply order requests to suppliers, the manufacturer computer 120 takes into account the time required by the supplier to produce and transport the supplies, and the time required by the manufacturer to stage and move the supplies to a location on the production line. The time required to complete the activities so the supplies are available at a production line location differs depending on the type of supply requested, the location of the supplier, etc. Tolerances for delays in transmission time for supply orders through computer systems, in manufacturing, in transporting, in staging, in moving, etc. may be factored in as well so that a supplier is able to meet the production delivery time associated with a particular supply order even if an unanticipated event occurs. Tolerances may differ depending on the type of activity such as computer communications, producing supplies, transporting supplies, etc.

Referring to FIG. 2, the manufacturer computer 120 may be adapted for communication with a sales computer 124. The manufacturer computer 120 may receive a sales order 126 from the sales computer 124 requesting one or more of the manufacturer's products. Because supply production is aligned with the manufacturer's production sequence and lead time for receiving supplies is reduced significantly, the manufacturer can arrange to order supplies so that products conforming to the seller's request are produced with little delay. The manufacturer computer 120 may also provide the sales computer 124 with an estimated delivery date for the requested products as well as periodic status information regarding the production of the requested products.

Figure 3:
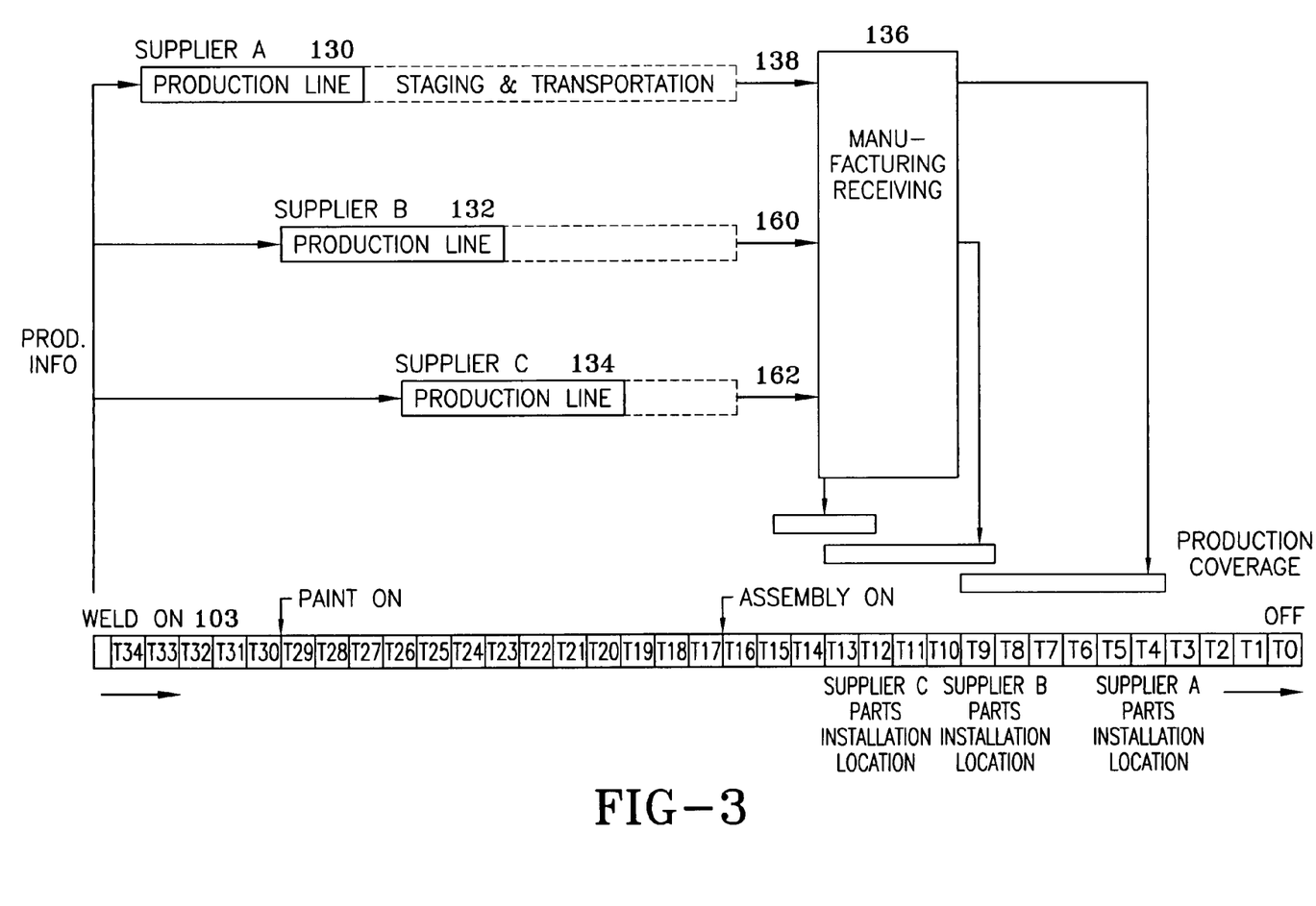
FIG. 3 is a timing diagram showing the processing of supply orders according to the invention.

Referring to FIG. 3, a timing diagram showing the processing of supply orders according to the invention is shown. During the production process, different supplies are consumed at different time points along a production line 103. Various conditions may result in the need to order additional supplies. Supplies are requested in accordance with a production delivery time that indicates when the supplies are needed at the manufacturer's facility. Taking into account the time required by the supplier to produce and transport the supplies, and the time required by the manufacturer to unload, stage, and move the supplies to a location on the production line, supply orders or requests are submitted to suppliers so that the supplier can meet the production delivery time deadline. Delays and interruptions that result when performing each of the activities may also be taken into account in determining the amount of time required for each of the activities. As shown in FIG. 3, if supplies from supplier A production line 130 are needed at time $T_4$ during the manufacturer's production, a supply order may be submitted to the supplier at time $T_{35}$ so that the supplier can deliver supply A 138 to the manufacturer's receiving facility 136 by the required time of $T_4$. The manufacturer's receiving facility 136 may be a part of the manufacturer's production facility or it may be a separate facility. After supply A 138 is received at the manufacturer's facility 136, it may be moved to a production line location by time $T_4$. Similarly, if supplies from supplier B production line 132 are needed at time $T_9$ during manufacturer's production, a supply order may be submitted to the supplier at time $T_{35}$ so that the supplier can deliver supply B 140 to the manufacturer's receiving facility 136 by the required time of $T_9$. If supplies from supplier C production line 134 are needed at time $T_{12}$ during manufacturer production, a supply order request may be submitted to the supplier at time $T_{35}$ so that the supplier can deliver supply C 142 to the manufacturer's receiving facility 136 by the required time of $T_{12}$. In an example embodiment of the invention, the containers in which the supplies are received are labeled by the supplier with a production delivery time and a production line location so that they may be distributed to production lines based on the time and location. Supplies are held at the production line location and consumed as needed during the production run.

How quickly supplies are made available at the production line depends on a number of factors including the type of supply and the manner in which it is used at the production line. Some supplies may be held at the manufacturer's receiving facility for only a few minutes while others are held for hours. Some supplies may arrive ready to be installed on the manufacturer's products while other supplies require some preparation by the manufacturer before they can be consumed. In either case, all supplies of certain types may be consumed by the end of a production run or shift so that no inventory is maintained by the manufacturer.

Figure 4:
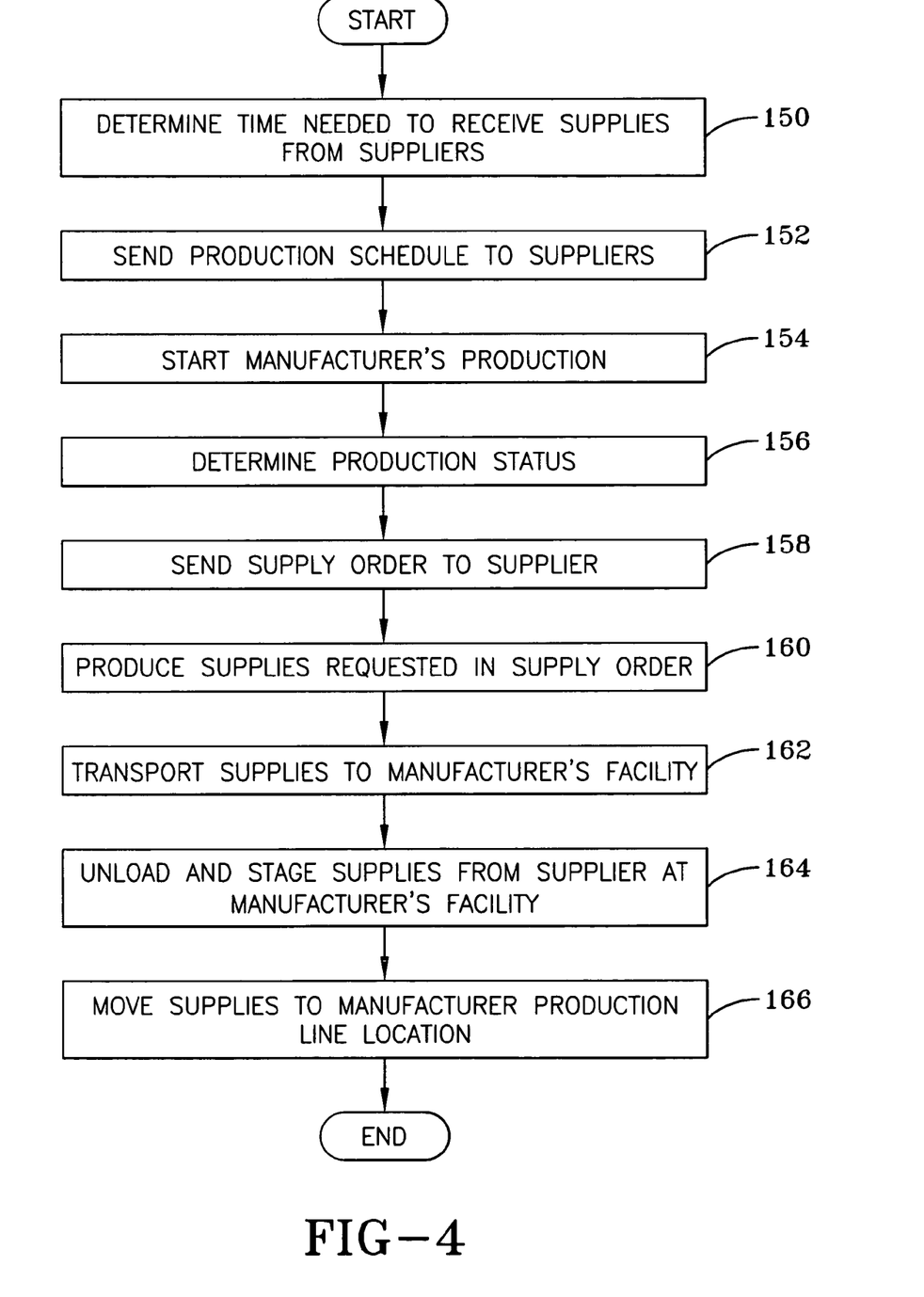
FIG. 4 is a flow diagram showing the supplier synchronization method of the invention.

Referring to FIG. 4, a flow diagram showing the supplier synchronization method of the invention is shown. In step 150, the manufacturer determines the time needed to receive supplies from each of its suppliers. The time needed to receive supplies may include the time required to submit supply orders to suppliers via various computer systems, the time required by the supplier to produce and transport the supplies, and the time required by the manufacturer to unload, stage, and move the supplies to a location on the production line. The time required may also include time for associated delays and interruptions that may result when performing each of the activities. Supplier production interruptions, transportation delays, computer outages, etc. may be accounted for when determining the time required to receive supplies. In the next step 152, the manufacturer's production schedule is shared with each of the suppliers so they can prepare and plan for upcoming supply orders. Because a supplier does not start producing supplies until a supply order is received, the supplier may need to insure certain preliminary steps have been completed so that production may begin upon receipt of a supply order. The supplier may complete the preliminary steps by using a forecasted quantity provided in the production schedule. In the next step 154, the manufacturer starts production of its products. Throughout the production process, the production status is evaluated as shown in step 156. During evaluation of the production status, the production sequence as well as other criteria that may be relevant in determining whether a supply order for a particular supply should be sent to a supplier. In step 158, a supply order is sent to a supplier. The supply order may comprise a production sequence, a production delivery time, and a production line location so that the supplier can meet the manufacturer's production requirements. Next 160, the supplier starts production of the supplies to meet the production requirements. The supplier then arranges to deliver the supplies to the manufacturer's facility in step 162. In step 164, the manufacturer unloads and stages the supplies from the supplier and in step 166 moves the supplies to the production line.

INDUSTRIAL APPLICABILITY

The present invention assists a large-scale assembly plant manufacturing operation in eliminating or significantly reducing inventory by synchronizing supplier production with the manufacturer's production. Upon receipt of a supply order, a supplier starts its manufacturing process to produce the requested supplies to meet the manufacturer's production delivery time. Upon arrival at the manufacturer's facility, supplies are moved to the production line so they are consumed by the end of the production run. As a result, the manufacturer is not required to maintain inventory for certain supplies.

While particular embodiments of the invention have been illustrated and described, various modifications and combinations can be made without departing from the spirit and scope of the invention, and all such modifications combinations, and equivalents are intended to be covered and claimed.

What is claimed is:

1. A computerized method for synchronizing a supplier's production with a manufacturer's production comprising the steps of:

establishing at a manufacturer's computer a production schedule for said manufacturer's production;

determining at said manufacturer's computer a production delivery time of day for receiving supplies from a supplier, said production delivery time determined by said manufacturer according to when said manufacturer requires said supplies on a production line to meet said manufacturer's production schedule;

determining at said manufacturer's computer a lead time for receiving said supplies from said supplier and delivering said supplies to a production line location;

transmitting during production from said manufacturer's computer to a supplier's computer an electronic supply order in accordance with said lead time, said electronic supply order comprising said production delivery time and said production line location according to said production schedule for said manufacturer's current production;

starting in response to receipt of said electronic supply order said supplier's production to produce supplies in accordance with said production delivery time;

labeling said supplies at said supplier's facility with said production delivery time and said production line location;

receiving said supplies from said supplier in accordance with said production delivery time according to said production schedule for said manufacturer's production;

moving said supplies to said production line location according to said production delivery time and said production line location indicated on a label for said supplies;

continuing production at said production line in accordance with said manufacturer's production schedule; and consuming said supplies in accordance with said production schedule established for said manufacturer's production.

2. The computerized method of claim 1 wherein the step of determining a lead time for receiving supplies from a supplier comprises the steps of:

determining a time required by said supplier to produce supplies;

determining a time required by said supplier to transport said supplies to said manufacturer;

determining a time required by said manufacturer to unload said supplies;

determining a time required by said manufacturer to said stage supplies;

determining a time required by said manufacturer to move said supplies to a location on said manufacturer's production line; and determining a total time by adding said time required by said supplier to produce supplies, said time required by said supplier to transport said supplies to said manufacturer, said time required by said manufacturer to unload said supplies, said time required by said manufacturer to stage said supplies, and said time required by said manufacturer to move said supplies to a location on said manufacturer's production line.

3. The computerized method of claim 2 further comprising the step of adding time to said total time to account for delays in each activity.

4. The computer method of claim 1 wherein the step of transmitting an electronic supply order from said manufacturer's computer to said supplier's computer-comprises the step of transmitting a production sequence comprising details regarding products to be produced on said production line.

5. The computerized method of claim 4 wherein the step of transmitting a production sequence to said supplier comprises the step of transmitting details about a model, type, options, and color for an automobile.

6. The computerized method of claim 1 wherein the step of transmitting an electronic supply order to said supplier's computer comprises the step of transmitting an electronic supply order to said supplier's computer in accordance with TCP/IP.

7. The computerized method of claim 1 wherein the step of transmitting an electronic supply order to said supplier's computer comprises the step of transmitting an electronic supply order to said supplier's computer in accordance with XML.

8. The computerized method of claim 1 wherein the step of transmitting an electronic supply order to said supplier's computer comprises the step of requesting a capacity confirmation from said supplier prior to transmitting an electronic supply order.

9. A computerized system for synchronizing a supplier's production with a manufacturer's production comprising:

a manufacturer's production line;

an electronic production schedule for said manufacturer's production line;

a manufacturer computer adapted to transmit supply orders to a supplier computer based on a current production status at said manufacturer's production line, said supply orders transmitted to said supplier according to a lead time that accounts for an amount of time to receive said supplies and an amount of time to move said supplies to a production line location;

a supplier computer adapted to receive electronic supply orders from said manufacturer computer, said electronic supply orders comprising production delivery times indicating when said manufacturer requires said supplies on a production line to meet said manufacturer's production schedule and production line locations indicating where said supplies are to be moved on said production line;

a supplier production line for producing supplies in accordance with a production delivery time in a supply order from said manufacturer computer, said production delivery time in accordance with a time said supplies are required on said production line to meet said production schedule for said manufacturer's production line and a production line location;

a label produced by said supplier for said supplies, said label comprising said production delivery time and said production line location;

a location at said manufacturer's production line identified by said production line location for receiving said supplies according to said production delivery time and holding said supplies produced by said supplier, wherein said supplies are consumed in accordance with said production schedule for said manufacturer's production line.

10. The computerized system of claim 9 wherein said electronic supply order comprises a production sequence.

11. The computerized system of claim 10 wherein said production sequence comprises a model, a type, a plurality of options, and a color for an automobile.

12. The computerized system of claim 9 wherein said manufacturer computer and said supplier computer are adapted for communication in accordance with TCP/IP.

13. The computerized system of claim 9 wherein said manufacturer computer and said supplier computer are adapted for communication in accordance with XML standards.

14. The computerized system of claim 9 further comprising a capacity confirmation received from said supplier computer.

15. A computerized method for synchronizing a supplier's production with a manufacturer's production comprising the steps of:

establishing an electronic production schedule for said manufacturer's production;

transmitting from a manufacturer's computer to a supplier's computer during a production process an electronic supply order comprising a production sequence, a production delivery time, and a production line location at said manufacturer in accordance with said production schedule for said manufacturer's production;

starting in response to receipt of said electronic supply order said supplier's production in accordance with said production delivery time;

producing at said supplier's facility a label for said supplies with said production delivery time and said production line location;

receiving supplies from said supplier in accordance with said production delivery time in said supply order;

moving said supplies to said production line location according to said production line location and said production delivery time indicated in said label for said supplies; and consuming said supplies at said production line location in accordance with said production schedule for said manufacturer's production.

16. The computerized method of claim 15 wherein said electronic production sequence comprises the step of transmitting details about a model, a type, a plurality of options, and a color for an automobile.

17. The computerized method of claim 15 wherein the step of starting said supplier's production in accordance with said production delivery time comprises the step of starting said supplier's production to meet said production delivery time of said production schedule for said manufacturer's production.

18. The computerized method of claim 15 wherein said production delivery time is based on a time required by said supplier to produce supplies, a time required by said supplier to transport said supplies to said manufacturer, a time required by said manufacturer to unload said supplies, a time required by said manufacturer to said stage supplies, and a time required by said manufacturer to move said supplies to said production line location.

19. The computerized method of claim 15 wherein the step of transmitting a supply order to said supplier's computer comprises the step of transmitting an electronic supply order to said supplier's computer in accordance with TCP/IP.

20. The computerized method of claim 15 wherein the step of transmitting a supply order to said supplier's computer comprises the step of transmitting an electronic supply order to said supplier's computer in accordance with XML.

21. The computerized method of claim 15 wherein the step of transmitting an electronic supply order to said supplier's computer comprises the step of requesting a capacity confirmation from said supplier.

* * * * *